United States Patent
Ferreira et al.

(10) Patent No.: US 10,977,022 B2
(45) Date of Patent: Apr. 13, 2021

(54) OPERATING SYSTEM RETRIEVAL

(71) Applicant: HEWLETT-PACKARD DEVELOPMENT COMPANY, L.P., Houston, TX (US)

(72) Inventors: Ronaldo Rod Ferreira, Porto Alegre (BR); Endrigo Nadin Pinheiro, Porto Alegre (BR); Fabio Riffel, Porto Alegre (BR); Christopher C. Mohrman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 284 days.

(21) Appl. No.: 16/084,104

(22) PCT Filed: Mar. 21, 2017

(86) PCT No.: PCT/US2017/023370
§ 371 (c)(1),
(2) Date: Sep. 11, 2018

(87) PCT Pub. No.: WO2018/174856
PCT Pub. Date: Sep. 27, 2018

(65) Prior Publication Data
US 2020/0326922 A1  Oct. 15, 2020

(51) Int. Cl.
*G06F 11/07* (2006.01)
*G06K 7/10* (2006.01)
(Continued)

(52) U.S. Cl.
CPC .............. *G06F 8/63* (2013.01); *G06F 9/548* (2013.01); *G06K 19/06046* (2013.01)

(58) Field of Classification Search
CPC ...... G06F 8/63; G06F 8/61; G06F 8/65; G06F 9/548; G06F 9/4416; G06F 16/13;
(Continued)

(56) References Cited

U.S. PATENT DOCUMENTS 7,681,080 B2  3/2010  Abali et al.
8,074,214 B2  12/2011  Isaacson et al.
(Continued)

FOREIGN PATENT DOCUMENTS

WO  2016114799 A1  7/2016

OTHER PUBLICATIONS

G. Bricker, Unified extensible firmware interface (UEFI) and secure boot: promise and pitfalls, 4 pages (Year: 2013).*
(Continued)

*Primary Examiner* — Thuy Dao
(74) *Attorney, Agent, or Firm* — HP Inc. Patent Department

(57) ABSTRACT

Examples associated with operating system retrieval are described. One example includes presenting a reference to an operating system image file. The image may be presented by a personal computer basic input/output system (BIOS). The personal computer may connect to a mobile device that has retrieved the operating system image file from a remote location based on the reference. The operating system image file is received from the mobile device, and initiated by the personal computer.

20 Claims, 5 Drawing Sheets

(51) Int. Cl.
*G06F 9/44* (2018.01)
*G06F 21/57* (2013.01)
*G06F 8/61* (2018.01)
*G06F 9/54* (2006.01)
*G06K 19/06* (2006.01)

(58) Field of Classification Search
CPC .. G06F 21/575; G06F 11/0772; G06F 11/106; G06F 9/4406; G06F 9/4401; G06F 21/10; G06F 21/31; G06F 11/079; G06F 11/0793; G06F 11/0709; H04L 63/101; H04L 63/20; G06K 19/06046
See application file for complete search history.

(56) References Cited

U.S. PATENT DOCUMENTS

| | | | |
|---|---|---|---|
| 8,107,945 B2 | 1/2012 | Hoffner et al. | |
| 8,707,086 B2 | 4/2014 | Poisner | |
| 9,064,117 B1 | 6/2015 | Worsley | |
| 9,529,602 B1 * | 12/2016 | Swierk | G06F 9/441 |
| 9,697,013 B2 * | 7/2017 | Seibert | G06F 9/453 |
| 10,049,009 B2 * | 8/2018 | Boyapalle | G06F 11/1417 |
| 2002/0073305 A1 | 6/2002 | Joseph et al. | |
| 2007/0067679 A1 | 3/2007 | Deobald | |
| 2010/0325490 A1 | 12/2010 | Anvin et al. | |
| 2012/0272090 A1 | 10/2012 | Poisner | |
| 2014/0033273 A1 * | 1/2014 | Rathbun | H04L 63/08 726/3 |
| 2014/0136828 A1 * | 5/2014 | Lewis | G06F 9/4416 713/2 |
| 2014/0282815 A1 | 9/2014 | Cockrell et al. | |
| 2014/0298293 A1 | 10/2014 | Nishio et al. | |
| 2016/0063253 A1 | 3/2016 | Tabone et al. | |
| 2016/0283311 A1 | 9/2016 | Joshi et al. | |

OTHER PUBLICATIONS

Zhang et al., A Trusted Bootstrap Scheme on EFI, 5 pages (Year: 2009).*
"DriveDroid—Softwarebakery", Retrieved from Internet—https://softwarebakery.com/projects/drivedroid, 2017, 3 Pages.
"How to Recover Remote Computers by Using the DaRT Recovery Image", Retrieved from internet—https://docs.microsoft.com/en-us/microsoft-desktop-optimization-pack/dart-v8/how-to-recover-remote-computers-by-using-the-dart-recovery-image-dart-8, 2017, 5 Pages.
Wi Fi Based Proximity Lock, ip.com Journal, ip.com Inc., West Henrietta, NY, US, Jul. 5 2807 (Jul. 5, 2007), XP813121183, ISSN: 1533-0801 * the whole document *.

* cited by examiner

OPERATING SYSTEM RETRIEVAL

BACKGROUND

Personal computers today rely on complex operating systems to provide user interfaces, application programmable interfaces, and so forth that allow users to take advantage of computing power. When an operating system fails, a user may seek to deliver an operating system image file to the computer that the computer can then use to install an operating system. Sometimes these image files may be retrieved or downloaded from a remote network location.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with operating system retrieval are described. When an operating system on a personal computer fails, a user of the personal computer may seek to reinstall the operating system or install a new operating system to continue using the personal computer. When the personal computer is able to connect to a network on which the replacement operating system is stored, the personal computer basic input/output system (BIOS) BIOS may be able to download the replacement operating system and automatically begin the operating system installation process.

However, for example, in cases where the personal computer fails at a location without a network the BIOS can automatically access, the personal computer may be unable to download the replacement operating system on its own. By way of illustration, a laptop seeking to connect to a public wireless network may be blocked from connecting to the network by a captive portal of the wireless network. This captive portal may seek, for example, agreement to terms of use, payment, viewing an advertisement, and so forth before allowing access to the public network. Though a BIOS could theoretically be designed to handle these types of requests, these requests would mean that in web browsing functionality would be built into the BIOS. Web browsing functionality could complicate the BIOS design, as BIOS are usually designed to quickly start up and pass control to an operating system.

Instead, the BIOS of the personal computer may display a reference (e.g., a quick response code) that describes a location of an operating system image file. The reference may be entered into or scanned by a mobile device which has network capabilities. These network capabilities may be through a cellular network, or even the network the personal computer could not access due to a lack of web browsing capability. The mobile device may download the operating system image file and deliver it to the personal computer, allowing the personal computer to begin installing the replacement operating system. In some examples, the operating system image file downloaded by the mobile device may be a partial operating system image file containing the web browsing functionality needed by the personal computer to access a network and downloading a complete operating system image file. This may be desirable when the complete operating system image file is large enough that downloading the complete operating system image file may, for example, tax a data plan of the phone, be faster to download directly to the personal computer, include sensitive data and/or settings, and so forth.

Figure 1:
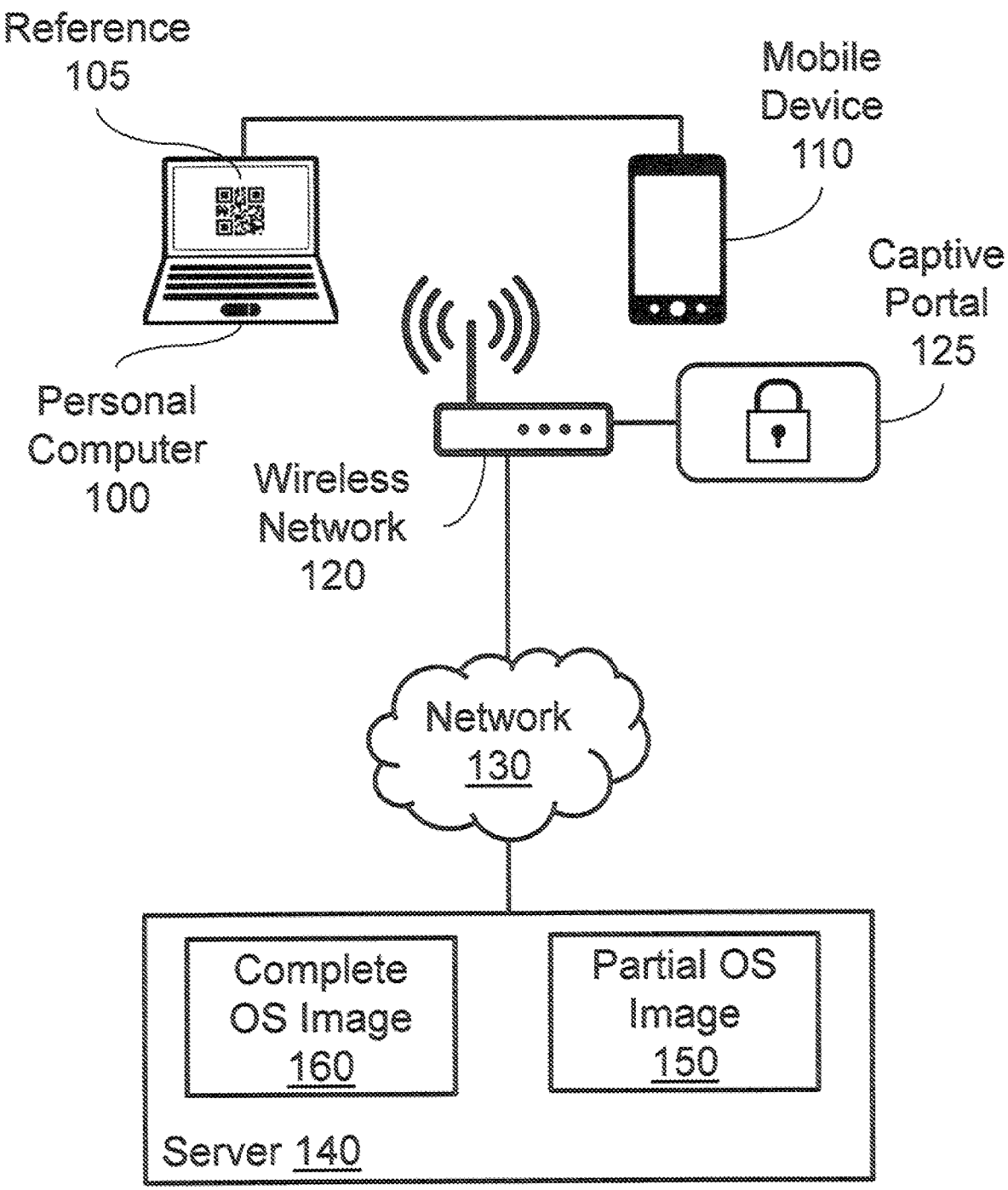
FIG. 1 illustrates example devices associated with operating system retrieval.

FIG. 1 illustrates example devices associated with operating system retrieval. It should be appreciated that the items depicted in FIG. 1 are illustrative examples, and many different systems, devices, and so forth, may operate in accordance with various examples.

FIG. 1 illustrates example devices associated with operating system retrieval. These devices include a personal computer 100. Personal computer 100 may be a laptop, a desktop, and so forth. In one example, personal computer 100 may have a failed operating system and is operating in a basic input/output system (BIOS) mode that is stored in the firmware of personal computer 100. In other examples, personal computer 100 may be operating in a BIOS mode prior to an initial installation of an operating system, because a user has prevented booting of the operating system because the user plans to replace the operating system, and so forth. In this example, the operating system that is planned to be installed on personal computer 100 may not be on hand. Instead, the operating system may be stored in one or more operating system image files on a server 140 remote to personal computer 100. As used herein, an operating system image file is a file containing a portion of an operating system sufficient to begin installation of the operating system on a personal computer. The operating system image file may include settings, applications, instructions, data, and so forth to facilitate managing hardware, software, and other resources of personal computer 100.

Thus, to obtain the operating system from server 140, personal computer 100 may seek to download the operating system image files from server 140 via a network 130 (e.g., the Internet). In some cases, however, personal computer 100 may connect to network 130 via an intermediary network, such as wireless network 120 in this example. In this example, for security, financial and/or other reasons, wireless network 120 may insist that devices seeking to access wireless network 120 perform one or more tasks involving a captive portal 125. These tasks may include, for example, registering a user, paying a fee, viewing an advertisement, agreeing to terms and conditions and so forth. Many of these tasks may assume that devices seeking to access wireless network 120 have access to web browsing capabilities. However, BIOS do not usually have these web browsing capabilities due to the complexities involved in implementing a web browser and the desire to keep BIOS fast and lightweight to quickly pass control over to an operating system after booting a computer.

Consequently, the BIOS of personal computer 100 may be configured to cause display of a reference 105 to a location at which an, operating system image, file may be obtained. In this example, reference 105 may point to a location of partial operating system image file 150. In various examples, reference 105 could be formed as a quick response (QR) code as shown here, a bar code, or other image that could be scanned by, for example a mobile device 110, Mobile device 110 may be, for example, a phone, a tablet, a laptop, and so forth. In other examples, reference 105 could be a uniform resource locator (URL) address, a code to be input into an application that tells the address to the application, and so forth. Upon receiving reference 105, mobile device 110 may use reference 105 to obtain the operating system image file from server 140. In the event that mobile device 110 also has to access server 140 via wireless network 120, mobile device 110 may have web browsing capabilities that allow mobile device 110 to pass through captive portal 125. After connecting to server 140, mobile device 110 may download partial operating system image file 150 to an internal memory.

Once mobile device 110, has obtained partial operating system image file 150, mobile device 110 may begin the process of transmitting the partial operating system image file 150 to personal computer 100. This may be achieved by first establishing a connection between mobile device 110 and personal computer 100. The connection may be established by, for example, mobile device 110 creating a wireless network for personal computer 100 to join, personal computer 100 creating a wireless network for mobile device 110 to join, a wired connection between mobile device 110 and personal computer 100 (e.g., Ethernet, universal serial bus), some other available wireless network, and so forth. When mobile device 110 or personal computer 100 create creates a wireless network for the other to join, details for connecting to that wireless network may be shown on respective displays so the details can be entered into the other device. After establishing a connection, mobile device 110 may transmit partial operating system image file 150 to personal computer 100.

Once personal computer 100 has received partial operating system image file 150 from mobile device 110, personal computer 100 may begin the process of installing an operating system stored in partial operating system image file 150. As used herein a partial operating system image file may include an operating system, that is missing various functionalities and/or configurations. This may be because the role of the partial operating system image file is to make it possible for personal computer 100 to be capable of downloading and installing a complete operating system image file 160. Thus, partial operating system image file 150 may include a web browsing function that allows personal computer 100 to connect to wireless network 120 and bypass captive portal 125 by performing or allowing a user to perform whatever tasks are sought by captive portal 125. Personal computer 100 may then connect to server 140 and obtain a complete operating system image file 160. As used here in a complete operating system image file may be data that can be used to ensure completion of installation of an operating system on personal computer 100. This may be achieved by, for example, supplementing operating system data from partial operating system image file 150, entirely replacing data from partial operating system image file 150, and so forth. This multi-step process for installing an operating system on personal computer 100 may be desirable when complete operating system image data is large enough that is undesirable to download and/or transmit the data via the intermediary mobile device 110, when complete operating system image file 160 includes security sensitive settings and data, and so forth. While this example describes a multi-phase delivery of an operating system to personal computer 100, in other examples, mobile device 110 may download and deliver a complete operating system image file 160 to personal computer 100.

In various examples, reference 105 may be embedded in personal computer 100 during the manufacture process of personal computer 100, during fleet management of personal computer 100 by an information technology department, and so forth. At this time space may be allocated on server 140 for partial operating system image file 150 and/or complete operating system image file 160. These actions may facilitate updating partial operating system image file 150 and/or complete operating system image file 160 over time. Updating the images may allow upgrading and/or updating operating systems delivered to personal computer 100, modifying functionalities of operating systems delivered to personal computer 100 based on, for example, permissions associated with a user associated with personal computer 100, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
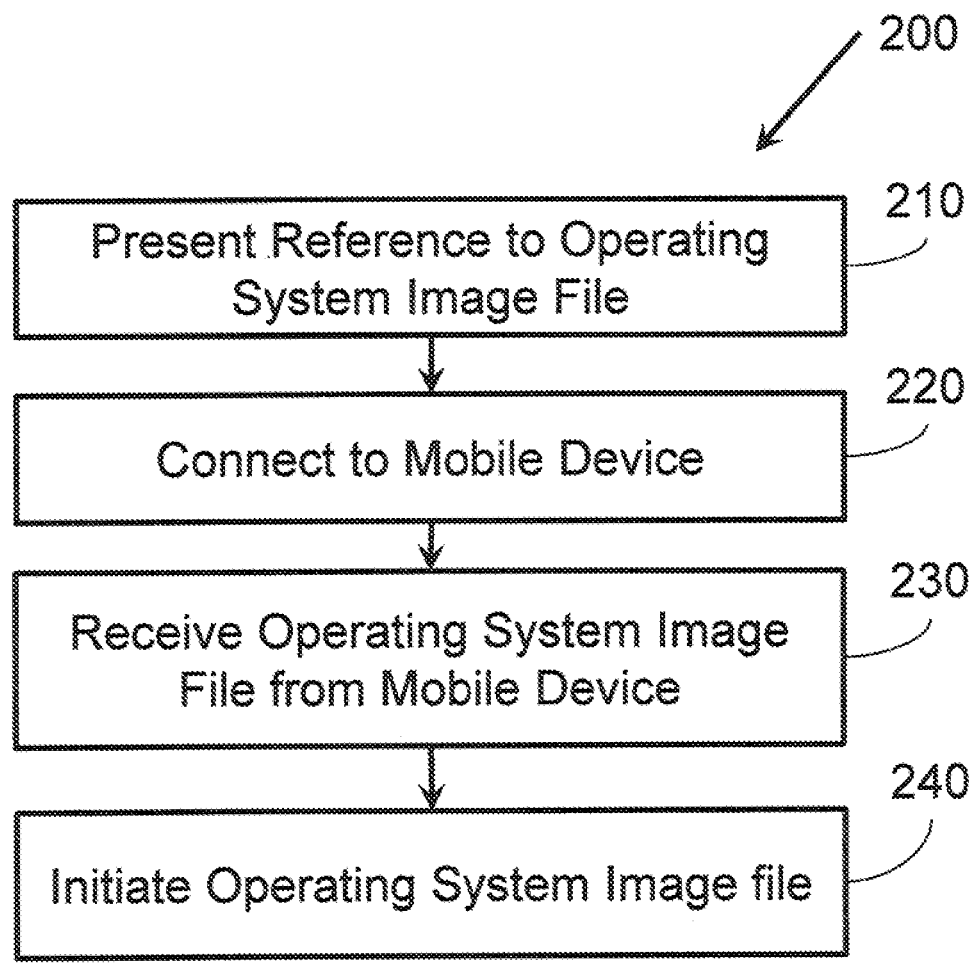
FIG. 2 illustrates a flowchart of example operations an example system associated with operating system retrieval.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with operating system retrieval. Method 200 may be performed by a personal computer's basic input/output system (BIOS). The personal computer may be a desktop, a laptop, a server, and so forth. Method 200 includes presenting a reference to an operating system image file at 210. The reference may be, for example, a quick response (QR) code that translates to uniform resource locator (URL) address. In some examples, the reference may be presented in response to a user action taken in the BIOS. In other examples, the reference may be a bar code scannable by a mobile device, a plaintext URL address to be entered into a mobile device by a user, and so forth.

Method 200 also includes connecting to a mobile device at 220. The mobile device may have retrieved the operating system image file from a remote location based on the reference provided to the mobile device at action 210. When a QR code is presented, the mobile device may scan the QR code and to obtain the location from the reference. The BIOS may connect to the mobile device via, for example, a wired connection, a wireless network generated by the mobile device, a wireless network generated by the BIOS, a local wireless network, and so forth. By way of illustration, after downloading the file, the mobile device may generate a local wireless network and display connection details for that wireless network. A user may then enter the connection details into the BIOS to allow the personal computer and the mobile device to connect.

Method 200 also includes receiving the operating system image file from the mobile device at 230. The operating system image file may be received over the connection established at action 220. In the example where the reference to the operating system image file is a QR code, the mobile device may scan the QR code to obtain the address (e.g., URL) at which the operating system image file is stored.

Method 200 also includes initiating the operating system image file at 240. This may facilitate the BIOS installing an operating system on the personal computer. In some examples, the operating system image file may be a partial operating system image file containing a web browsing function. A complete operating system image file may be downloaded once a user has connected to a local network using the web browsing function. By way of illustration, after the partial operating system image file has been sufficiently installed to allow the personal computer to use the web browsing function, a user may be invited to connect to local networks. Connecting to one of these networks may involve performing certain actions associated with a captive portal (e.g., entering payment, agreeing to terms and conditions). Once the personal computer is connected to this network, the personal computer may download the complete operating system file to complete installation of the operating system.

Figure 3:
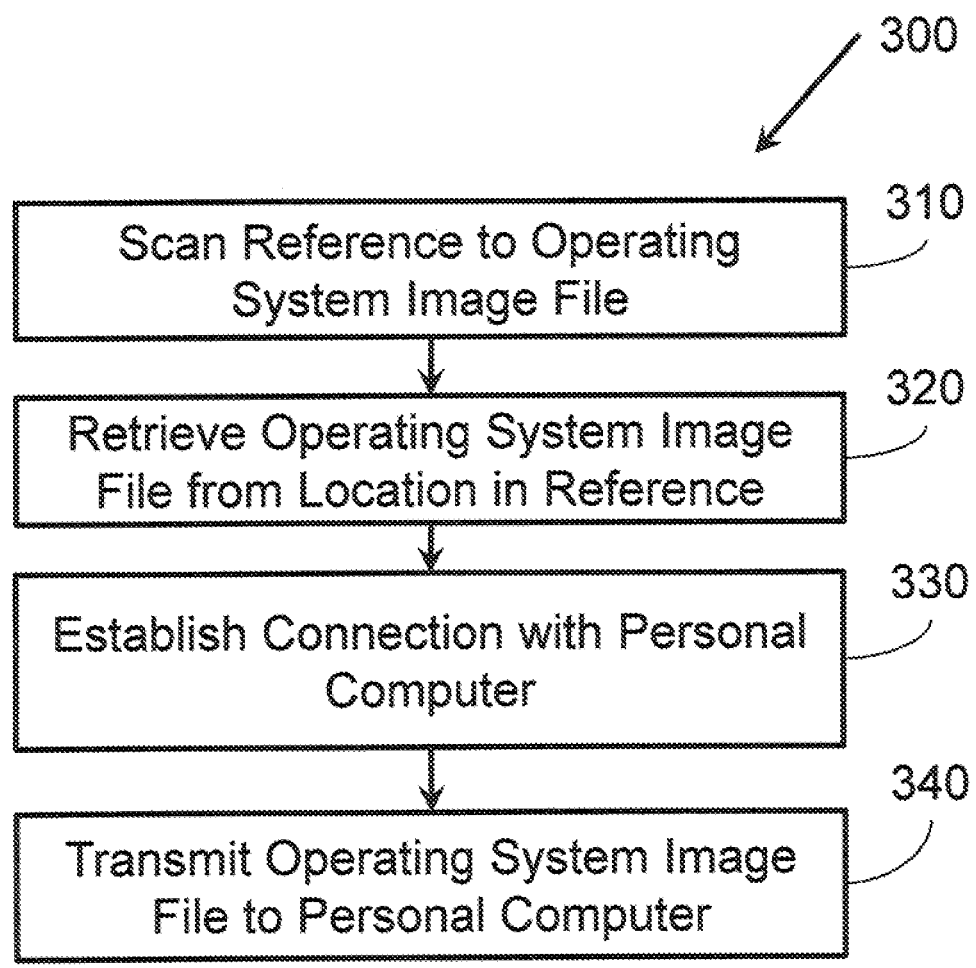
FIG. 3 illustrates another flowchart of example operations associated with operating system retrieval.

FIG. 3 illustrates another example method 300 associated with operating system retrieval. In various examples, method 300 may be performed by a mobile device. The mobile device may be, for example, a phone, a tablet, a laptop, and so forth. Method 300 includes scanning a reference to an operating system image file at 310. The reference may be scanned via a camera of the mobile device. The reference may be scanned from a display (e.g., a monitor) linked to a personal computer. The personal computer may be operating in a basic input/output system (BIOS) mode. When the mobile device scans the reference, data may be extracted from the reference describing a location at which the operating system image file may be obtained.

Method 300 also includes retrieving the operating system image file at 320. The operating system image file may be retrieved from a location identified in the reference. In one example, the operating system image file may have been specifically configured for use with the personal computer. By way of illustration, the reference may point to an operating system image file configured specifically for the personal computer from which the reference was scanned. This may allow, for example, a company to associate a specific operating system or system settings with the personal computer and/or a user of the personal computer.

Method 300 also includes establishing a connection to the personal computer at 330. In one example, establishing the connection to the personal computer may include creating a wireless network and providing connection details of the wireless network via a display of the mobile device. The connection details, when delivered to the BIOS of the personal computer may allow the personal computer to connect to the wireless network. In an alternative example, establishing the connection may include detecting a universal serial bus (USB) data connection to the personal computer. Other connections may also be possible.

Method 300 also includes transmitting the operating system image file to the personal computer at 340. The operating system image file may be transmitted using the connection established at action 330. The personal computer may use the operating system image file to install an operating system. Thus, method 300 may allow a mobile device with a web browsing capability to begin downloading an operating system for a personal computer that does not yet have that web browsing capability. The web browsing capability may allow the mobile device to connect to a network through a captive portal that the personal computer is unable to handle until an operating system with a web browsing capability is installed.

Figure 4:
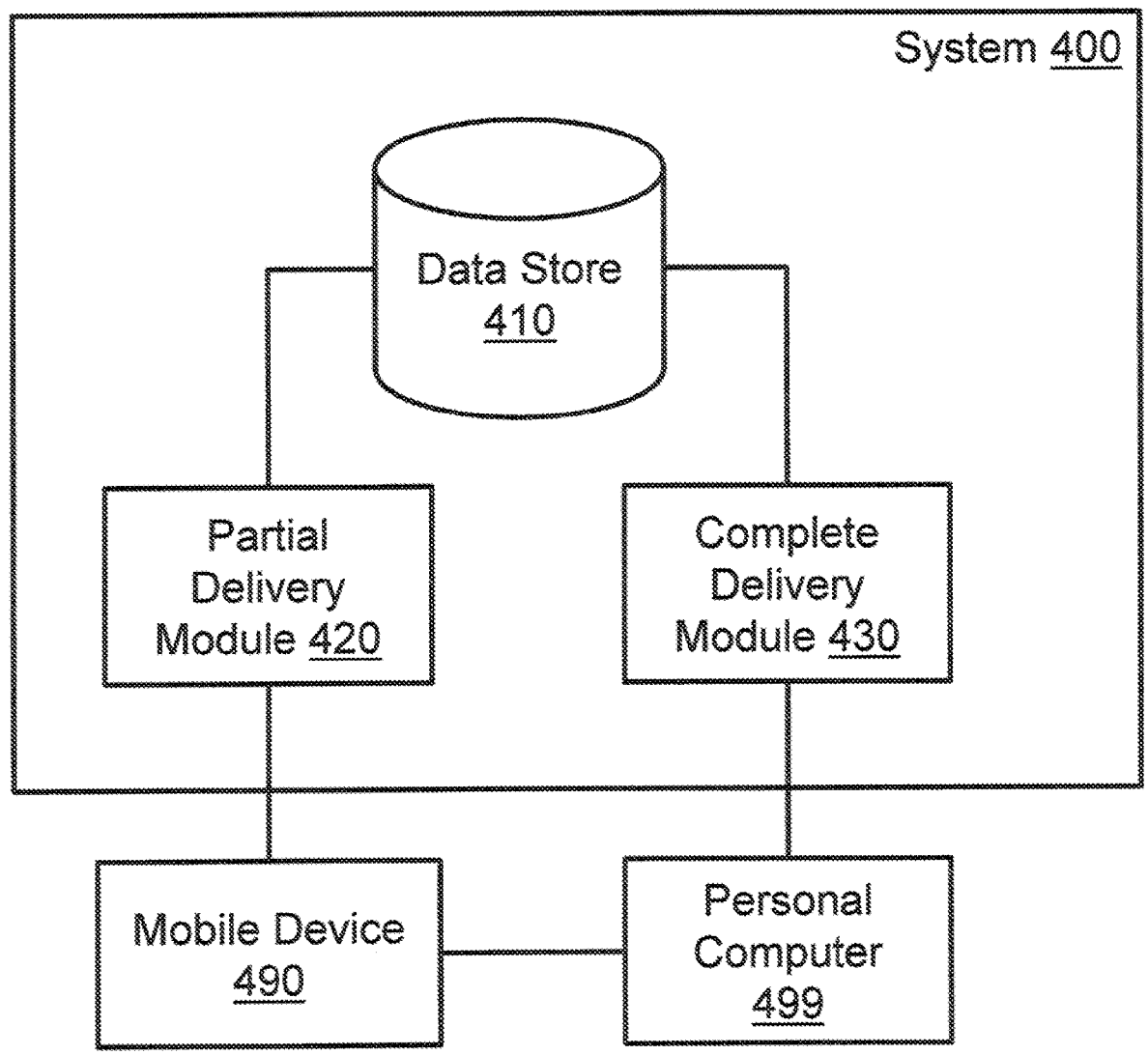
FIG. 4 illustrates an example system associated with operating system retrieval.

FIG. 4 illustrates a system 400 associated with operating system retrieval. System 400 includes a data store 410. Data store 410 may store a set of partial operating system image files and a set of complete operating system image files.

System 400 also includes a partial delivery module 420. Partial delivery module 420 may receive a request to retrieve a partial operating system image file. The request to retrieve the partial operating system image file may be received from a mobile device 490. In response to the request, partial delivery module 420 may deliver the partial operating system image file to mobile device 490. The request may be based on an address mobile device 490 obtained from a personal computer 499. The address may be received by mobile device 490 when personal computer 499 is operating in a basic input/output system BIOS mode. In one example, the address obtained by mobile device 490 from the BIOS may be embedded in personal computer 499 during manufacture of the personal computer 499. Additionally, space in data store 410 may be allocated for the partial operating system file during manufacture of personal computer 499. These actions may allow the address to be embedded in personal computer 499 in a manner that allows updating the partial operating system file. Updating the partial operating system may facilitate keeping an operating system installed on personal computer 499 up to date with respect to security settings, company rules, and so forth. The partial operating system file may contain configuration settings designed specifically for a component of personal computer 499, a user of personal computer 499, and so forth.

System 400 also includes a complete delivery module 430. Complete delivery module 430 may receive a request to retrieve a complete operating system image file from personal computer 499. In response to the request to retrieve the complete operating system image file, complete delivery module 430 may transmit the complete operating system image file to personal computer 499. The request for the complete operating system image file may be received after personal computer 499 has received the partial operating system from mobile device 490. The partial operating system image file may contain a function that allows personal computer 499 to connect to a network. In various examples, the function that allows personal computer 499 to connect to a network may be a web browser function that allows a user to bypass a captive portal.

Figure 5:
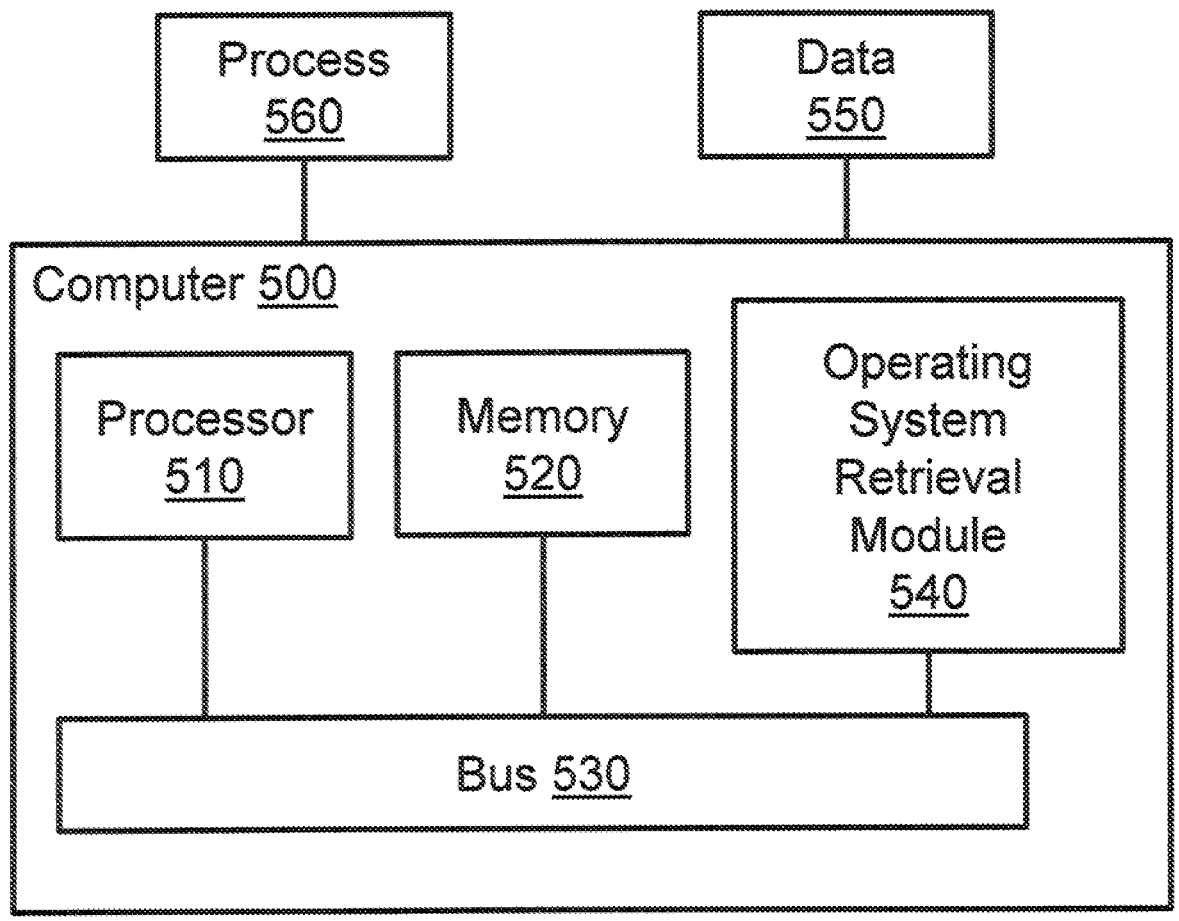
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes an operating system retrieval module 540. Operating system retrieval module 540 may perform, alone or in combination, various functions described above with reference to the example systems, methods, and so forth. In different examples, operating system retrieval module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   presenting, by a personal computer basic input/output system (BIOS), a reference to an operating system image file;
   connecting to a mobile device that has retrieved the operating system image file from a remote location based on the reference;
   receiving the operating system image file from the mobile device; and
   initiating the operating system image file.

2. The method of claim 1, wherein the reference is a quick response (QR) code, and wherein the mobile device scans the QR code to obtain an address at which the operating system image file is stored.

3. The method of claim 1, where the reference is presented in response to a user action taken with respect to the BIOS.

4. The method of claim 1, wherein the BIOS connects with the mobile device via one of a wired connection, a wireless network generated by the mobile device, a wireless network generated by the BIOS, and a local wireless network.

5. The method of claim 1, wherein the operating system image file is a partial operating system image file containing a web browsing function, the method further comprising downloading a complete operating system image file after a user has connected to a local network using the web browsing function.

6. The method of claim 1, wherein the connecting, the receiving, and the initiating are performed by the personal computer BIOS.

7. The method of claim 1, wherein the connecting is over a wireless network between the personal computer and the mobile device.

8. A mobile device comprising:
   a camera to scan, from a display linked to a computer operating in a basic input/output system (BIOS) mode, a reference to an operating system image file;
   a processor; and
   a non-transitory storage medium storing instructions executable on the processor to:
   retrieve the operating system image file from a location identified in the reference;
   establish a connection to the computer; and
   transmit the operating system image file to the computer that is to use the operating system image file to install an operating system in the computer.

9. The mobile device of claim 8, wherein the instructions are executable on the processor to establish the connection to the computer by creating a wireless network for the computer to join.

10. The mobile device of claim 8, wherein the connection is a universal serial bus (USB) connection between the mobile device and the computer.

11. The mobile device of claim 8, wherein the operating system image file is configured for use with the computer.

12. The mobile device of claim 8, wherein the connection is a wireless connection between the mobile device and the computer.

13. The mobile device of claim 8, wherein the instructions are executable on the processor to interact with a BIOS in the computer over the connection.

14. The mobile device of claim 8, wherein the reference comprises a quick response (QR) code.

15. A system comprising:
   a non-transitory storage medium to store a partial operating system image file, a complete operating system image file, and machine-readable instructions; and
   a processor,
   wherein the machine-readable instructions are executable on the processor to:
   receive, from a mobile device, a first request to retrieve the partial operating system image file,
   deliver the partial operating system image file to the mobile device, wherein the first request is based on an address the mobile device obtained from a computer operating in a basic input/output system (BIOS) mode,
   receive, from the computer, a second request to retrieve the complete operating system image file, and
   transmit the complete operating system image file to the computer, wherein the second request is received after the computer has received the partial operating system image file from the mobile device, and wherein the partial operating system image file contains a function that allows the computer to connect to a network.

16. The system of claim 15, wherein the function that allows the computer to connect to the network is a web browser function that allows a user to bypass a captive portal.

17. The system of claim 15, wherein the partial operating system image file contains configuration settings the computer.

18. The system of claim 15, wherein the address obtained by the mobile device from the computer is embedded in a manner that allows updating of the partial operating system image file.

19. The system of claim 15, wherein the address obtained by the mobile device from the computer is embedded in the computer during manufacture of the computer.

20. The system of claim 15, wherein the address is from a quick response (QR) code scanned by the mobile device when the QR code is displayed by the computer.

* * * * *